(12) United States Patent
Kim et al.

(10) Patent No.: US 8,607,047 B2
(45) Date of Patent: Dec. 10, 2013

(54) MOBILE SYSTEM, SERVICE SYSTEM, AND SERVICE PROVIDING METHOD TO SECURELY TRANSMIT PRIVATE INFORMATION FOR USE IN SERVICE

(75) Inventors: Eunah Kim, Seoul (KR); Jeong Hyun Yi, Daejeon-si (KR); Won Keun Kong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 652 days.

(21) Appl. No.: 12/432,191

(22) Filed: Apr. 29, 2009

(65) Prior Publication Data
US 2010/0153720 A1    Jun. 17, 2010

(30) Foreign Application Priority Data
Dec. 11, 2008   (KR) ........................ 10-2008-0125746

(51) Int. Cl.
*H04L 9/32*        (2006.01)
(52) U.S. Cl.
USPC .......................................... 713/168; 380/270
(58) Field of Classification Search
USPC .......................................... 713/168; 380/270
See application file for complete search history.

(56) References Cited

U.S. PATENT DOCUMENTS

| 2007/0135164 | A1* | 6/2007 | Lee ................................ 455/558 |
| 2007/0278290 | A1* | 12/2007 | Messerges et al. ........... 235/380 |
| 2008/0098223 | A1* | 4/2008 | Tan et al. ...................... 713/170 |
| 2008/0114861 | A1* | 5/2008 | Gildred ......................... 709/219 |
| 2010/0044433 | A1* | 2/2010 | Wankmueller et al. ....... 235/381 |

FOREIGN PATENT DOCUMENTS

| KR | 10-2004-0016548 | 2/2004 |
| KR | 10-2004-0060249 | 7/2004 |
| KR | 10-2004-0061248 | 7/2004 |
| KR | 10-2004-0069294 | 8/2004 |
| KR | 10-2006-0125032 | 12/2006 |
| KR | 10-2008-0069568 | 7/2008 |

\* cited by examiner

*Primary Examiner* — Edward Zee
*Assistant Examiner* — Baotran N To
(74) *Attorney, Agent, or Firm* — NSIP Law

(57) ABSTRACT

A mobile system, a service system, and a service providing method for securely transmitting private information for use in a service are provided. The mobile system maintains at least one user data and identification data with respect to the user data used for processing at least one service, sets a session key for the service system, and encrypts service data identified based on the identification data to transmit to the service system.

16 Claims, 6 Drawing Sheets

US 8,607,047 B2

MOBILE SYSTEM, SERVICE SYSTEM, AND SERVICE PROVIDING METHOD TO SECURELY TRANSMIT PRIVATE INFORMATION FOR USE IN SERVICE

CROSS-REFERENCE TO RELATED APPLICATION

This application claims the benefit under 35 U.S.C. §119 (a) of a Korean Patent Application No. 10-2008-0125746, filed on Dec. 11, 2008, in the Korean Intellectual Property Office, the entire disclosure of which is incorporated herein by reference.

BACKGROUND

1. Field

The following description relates to a mobile system to securely transmit private information for use in a service.

2. Description of Related Art

Private information may be required to be securely transmitted in a network. As an example, information including identification information such as a social security number of a user, an ID and password for a specific service, credit information such as a credit card number, and the like, may be required to be securely transmitted to a corresponding system without exposure to another user or to another system. Particularly, since the private information is transmitted through open space via a radio signal in a wireless network environment, secure transmission of the private information is desired. The private information of the user may be stored in a mobile device of the user and used for processing a service. The mobile device having portability and mobility may need to maintain the portability and mobility of the mobile device when performing the transmission of the private information, and at the same time, may substantially need to maintain security. That is, a method for more securely and conveniently transmitting the private information stored in the mobile device may be needed.

SUMMARY

In one general aspect, there is provided a mobile system that maintains user data used for a variety of services, such as a social security number, credit card number, and the like, in a single storage medium, and transmits the user data to a corresponding service system without exposure to another user or to another system using a session key.

In another general aspect, there is provided a mobile system that recommends user data suitable for a service that a user intends to use from among a variety of services stored in a storage medium of a mobile system, and that directly receives the corresponding user data from the mobile system using a session key to provide the corresponding service.

In another general aspect, there is provided a mobile system including a data maintaining unit to maintain at least one user data used for processing at least one service data and at least one identification data with respect to the user data, a session key setting unit to set a session key for a service system to which the user data is to be sent, a user data identifying unit to identify the user data corresponding to a service processed in the service system, based on the identification data, an encrypting unit to encrypt the identified user data using the session key, and a data transmitting unit to transmit the encrypted user data to the service system.

The encrypted user data may be decrypted by a session key that is set in the service system, and the corresponding service of the service system may be processed based on the decrypted user data.

The mobile system may further include a list transmitting unit to transmit a list of the identification data to the service system, and an identification data identifying unit to identify the identification data selected from the service system based on the list. The user data identifying unit may identify the user data corresponding to the identified identification data.

The mobile system may further include a verification data receiving unit to receive verification data with respect to the selected identification data, and a verifying unit to verify the verification data based on the selected identification data and the session key.

In response to the identification data satisfying a condition predetermined according to the service in the service system, information corresponding to the identification data may be displayed through the service system, and the selected identification data may include identification data corresponding to information selected by a user from among displayed information.

The user data may include payment data used for mobile payment, and the identification data may include information for identifying a type of payment corresponding to the payment data. The data maintaining unit may maintain different formats of user data depending on payment means as data of a predetermined format.

In another general aspect, there is provided a service system, including a session key setting unit to set a session key for a mobile system, a list requesting unit to request a list of identification data with respect to user data, both from the mobile system and in response to an inputted service request, an identification data selection unit to select identification data suitable for a corresponding service based on the list received from the mobile system, a user data receiving unit to receive encrypted user data from the mobile system, a decrypting unit to decrypt the encrypted user data using the session key, and a service providing unit to provide the corresponding service based on the decrypted user data.

The identification data selection unit may include an identification data identifying unit to identify identification data satisfying a condition predetermined according to the corresponding service, from among identification data included in the list, a displaying unit to display information with respect to the identified identification data, and a selection unit to select identification data, corresponding to information selected from among the displayed information by the user, as identification data suitable for the corresponding service.

The service system may further include a verification data generating unit to generate verification data based on the selected identification data and the session key, and a transmitting unit to transmit the selected identification data and the verification data to the mobile system, wherein the verification data is verified in the mobile system to verify the selected identification data.

The encrypted user data may be generated in the mobile system by encrypting user data corresponding to the selected identification data using the session key of the mobile system.

The user data may include payment data used for mobile payment, and the identification data may include information for identifying a type of payment corresponding to the payment data.

The mobile system may maintain different formats of user data depending on payment means and identification data with respect to the user data as data of a predetermined format.

In another general aspect, there is provided a method for providing a service, the method including setting a session key for a mobile system, requesting a list of identification data with respect to user data, both from the mobile system and in response to an inputted service request, selecting an identification data suitable for a corresponding service based on the list received from the mobile system, receiving encrypted user data from the mobile system, decrypting the encrypted user data using the session key, and providing the corresponding service based on the decrypted user data.

The selecting of the identification data may include identifying identification data corresponding to a condition predetermined according to the corresponding service, from among identification data included in the list, displaying information with respect to the identified identification data, and selecting identification data, corresponding to information selected by the user and from among the displayed information, as the identification suitable for the corresponding service.

The method may further include generating verification data based on the selected identification data and the session key, and transmitting the selected identification data and the verification data to the mobile system, wherein the verification data is verified in the mobile system to verify the selected identification data.

The encrypted user data may be generated in the mobile system by encrypting user data corresponding to the selected identification data using the session key of the mobile system.

The user data may include payment data used for mobile payment, and the identification data may include information for identifying a type of payment corresponding to the payment data.

The mobile system may maintain different formats of user data depending on different payment means and identification data with respect to the user data as data of a predetermined format.

Other features and aspects will be apparent from the following detailed description, the drawings, and the claims.

Figure 1:
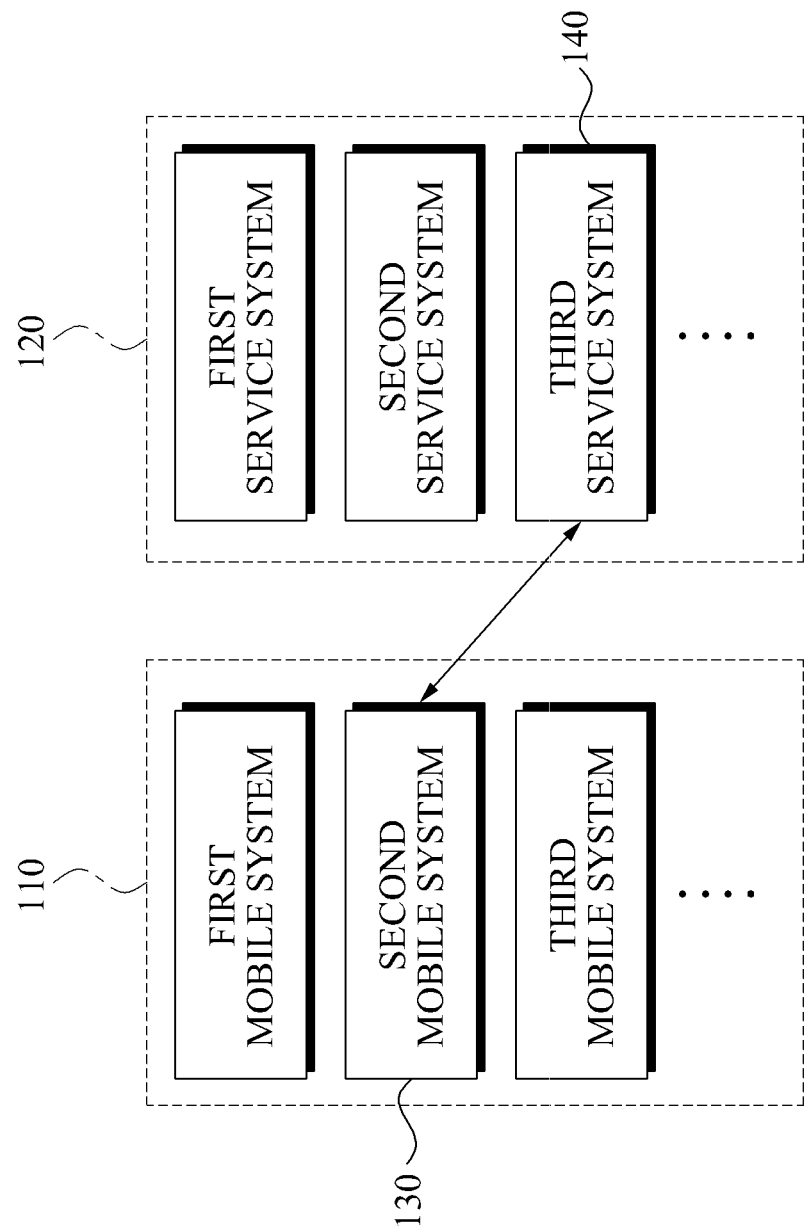
FIG. 1 is a diagram illustrating an exemplary configuration of a mobile system and service system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates a configuration of an exemplary mobile system and a service system. A first dotted-line box 110 indicates mobile systems, and a second dotted-line box 120 indicates service systems. The mobile systems may communicate with the service systems to transmit user data used for a service that is provided by the service systems.

Here, a device that includes a storage medium and is able to perform communications may be used as a mobile system. Also, a device that is able to communicate with the mobile system and is able to provide a predetermined service may be used as a service system. For example, as the mobile system, a device that has mobility and portability and includes a storage medium and communication function, such as a portable phone, a personal digital assistant (PDA), a notebook, or a MP3 player or MD player which are able to perform local wireless communication, may be used. Also, in addition to the portable phone, the PDA, the notebook, and the like, a device that is able to communicate with the mobile system and is able to provide a predetermined service even though the device may not have mobility or portability, such as a PC and a server, may be used as the service system. As an example, a second mobile system 130 may be a portable phone that stores credit card information as the user data, and a third service system 140 may be a terminal that provides payment service for a product displayed in a supermarket and the like.

The mobile system may maintain various types of user data and identification data with respect to the user data, and may provide a list of the identification data to the service system. The service system may recommend user data suitable for a corresponding service or information for a combination of a plurality of user data. In response to one of user data recommended by the service system being selected by a user, the mobile system may transmit, to the service system, the user data selected from among the various types of user data. As an example, a third service system 140 may recommend information of user data, such as information of a credit card that offers interest-free installment payment, or information of a combination of user data with respect to the credit card and a discount card, such as a mobile carrier membership card and the like, based on a list of received identification data. The mobile system may transmit user data corresponding to information selected by the user, and thereby enabling the service system to proceed with a payment service.

The selected user data may be encrypted in the mobile system using a session key which is set between the mobile system and the service system, and the encrypted user data is transmitted to the service system. Also, the encrypted user data is decrypted in the service system and used for providing service.

That is, a mobile system and service system according to example embodiments may enable maintaining user data used for a variety of services, such as a social security number, a credit card number, and the like, in a single storage medium, transmitting the user data to a corresponding service system without exposure to another user or to another system using a session key, recommending user data suitable for a service that a user intends to use from among a variety of services stored in a storage medium of a mobile system, and directly receiving the corresponding user data from the mobile system using a session key to provide the corresponding service.

Figure 2:
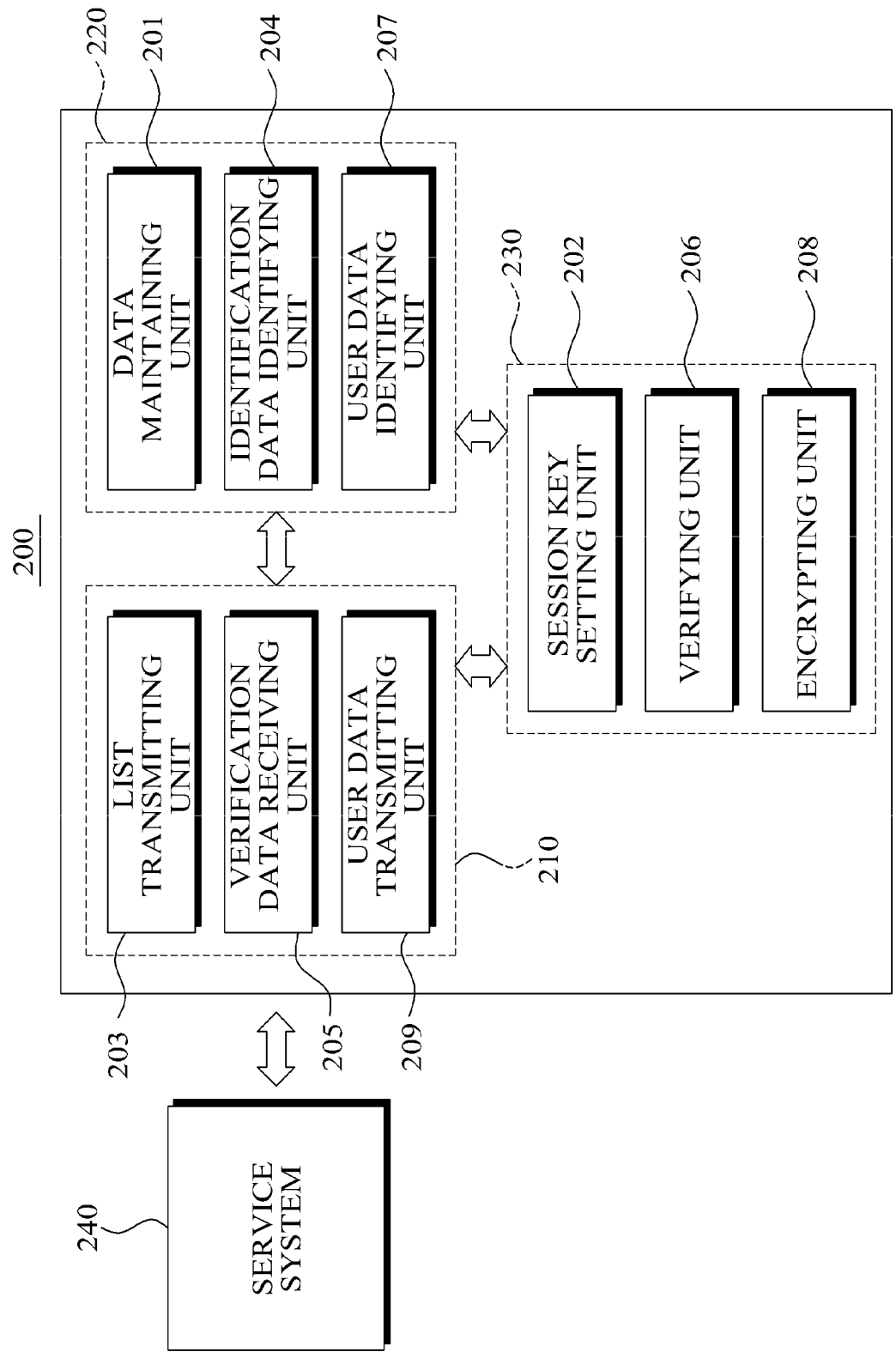
FIG. 2 is a diagram illustrating an exemplary internal configuration of a mobile system.

The mobile system, service system, and service providing method is described further with reference to FIGS. 2 though 6.

FIG. 2 illustrates an exemplary internal configuration of a mobile system 200. The mobile system 200 includes a data maintaining unit 201, a session key setting unit 202, a list transmitting unit 203, an identification data identifying unit 204, a verification data receiving unit 205, a verifying unit 206, a user data identifying unit 207, an encrypting unit 208 and a user data transmitting unit 209. The list transmitting unit 203, the verification data receiving unit 205, and the user data transmitting unit 209 included in a first dotted-line box 210, the data maintaining unit 201, the identification data identifying unit 204, and the user data identifying unit 207 included in a second dotted-line box 220, and the session key setting unit 202, the verifying unit 206, and the encrypting unit 208 included in a third dotted-line are respectively modularized to be constituted in the mobile system 200.

The data maintaining unit 201 maintains at least one user data and identification data with respect to the user data used for processing at least one service. As an example, the user data may include payment data used for mobile payment, and the identification data may include information for identifying a type of payment corresponding to the payment data. The data maintaining unit 201 may maintain different formats of user data depending on payment means as data of a predetermined format. That is, the data maintaining unit 201 maintains user data with respect to a variety of payment means, as described with reference to FIG. 1. Examples according to the mobile payment are merely provided for ease of description, and accordingly, the examples are not limited to those according to the mobile payment. According to other examples, when information such as an ID, password, and a social security number, is used in a common-use computer, exemplary embodiments may be used to prevent exposure of the information to another user or to another system.

The session key setting unit 202 may set a session key for a service system 240 to which the user data is to be transmitted. The session key set between the mobile system 200 and the service system 240 may be used in encrypting and decrypting of the user data.

The list transmitting unit 203 may transmit a list of the identification data to the service system. The identification data satisfies a condition predetermined according to a service in the service system 240, and information corresponding to the identification data may be displayed through the service system 240. As an example, when the service system 240 is a system which provides a payment service, the service system 240 may identify identification data which is available for payment, and may display information corresponding to the identified identification data, thereby enabling a user to easily and conveniently check information about a currently available payment means. The service system 240 may discover optimal identification data suitable for a corresponding service from among identification data included in the list, and may recommend information corresponding to the optimal identification data to the user.

The identification data identifying unit 204 identifies identification data selected in the service system based on the list. Here, the selected identification data may include identification data corresponding to information selected by the user from among displayed information. That is, in response to one of recommended information or displayed information being selected by the user, the service system 240 may transmit identification data corresponding to the selected information to the mobile system 200, and the identification data identifying unit 204 may identify the selected identification data which is received identification data.

The verification data receiving unit 205 receives verification data with respect to the selected identification data. That is, the service system 240 may additionally transmit verification data generated based on the selected identification data and the session key together with the selected identification data, and the verification data receiving unit 205 may receive the transmitted verification data.

The verifying unit 206 verifies the verification data based on the selected identification data and the session key. A predetermined algorithm may be used for generating the verification data. As an example, when message authentication code (MAC) is used as the verification data, the verifying unit 206 generates an MAC with respect to the identification data received from the session key to compare with the received verification data, thereby authenticating that the selected identification data is transmitted without alteration. A hash function may be used to generate the MAC.

The user data identifying unit 207 identifies user data corresponding to a service processed in the service system, based on the identification data. The user data identifying unit 207 may identify user data corresponding to the identification data identified through the identification data identifying unit 204.

The encrypting unit 208 encrypts the identified user data using the session key. That is, the encrypting unit 208 may encrypt the user data identified through the user data identifying unit, using the session key.

The user data transmitting unit 209 transmits the encrypted user data to the service system 240. The encrypted user data may be decrypted using a session key that is set in the service system, and a corresponding service of the service system 240 may be processed based on the decrypted user data.

Figure 3:
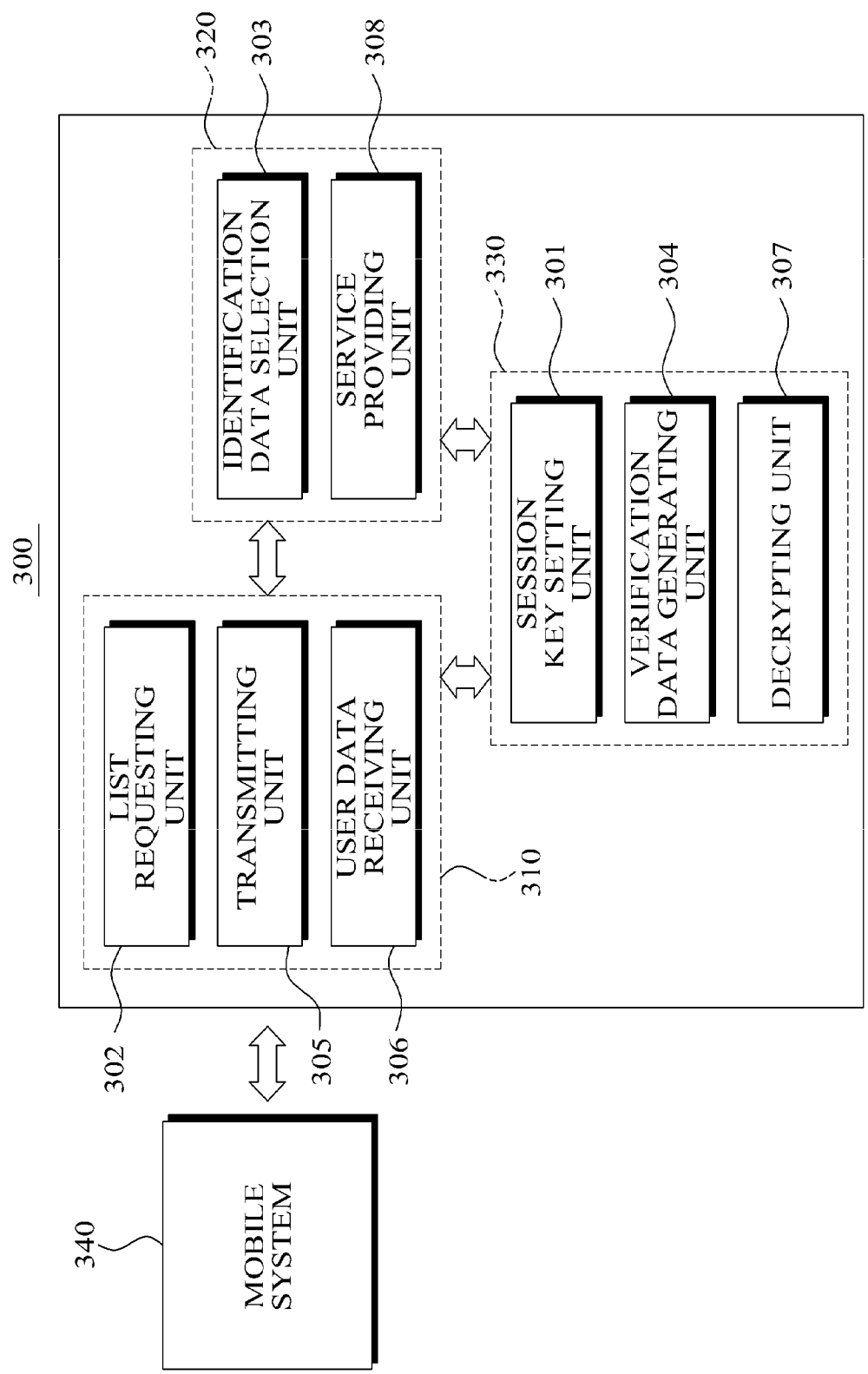
FIG. 3 is a diagram illustrating an exemplary internal configuration of a service system.

FIG. 3 illustrates an exemplary internal configuration of a service system 300. The service system 300 includes a session key setting unit 301, a list requesting unit 302, an identification data selection unit 303, a verification data generating unit 304, a transmitting unit 305, a user data receiving unit 306, a decrypting unit 307, and a service providing unit 308. The list requesting unit 302, the transmitting unit 305, and the user data receiving unit 306 included in a first dotted-line box 310, an identification data selection unit 303, and the service providing unit 308 included in a second dotted-line box, and the session key setting unit 301, the verification data generating unit 304, and the decrypting unit 307 included in a third dotted-line 330 are respectively modularized to be constituted in the service system 300.

The session key setting unit 301 sets a session key for the mobile system 340. The session key between the mobile system 340 and the service system 300 may be used for encrypting and decrypting the user data.

The list requesting unit 302 requests a list of the identification data with respect to the user data from the mobile system 340 in response to an inputted service request. Here, as an example, the user data may include payment data used for mobile payment, and the identification data may include information for identifying a type of payment corresponding to the payment data. The mobile system 340 may maintain different formats of user data depending on payment means and identification data with respect to the user data as data of a predetermined format. That is, the list requesting unit 302 may request a list with respect to identification data that the mobile system 340 maintains from the mobile system.

The identification data selection unit 303 selects identification data suitable for the corresponding service based on the list received from the mobile system 340. The identification data selection unit 303 may include an identification data identifying unit (not illustrated) that identifies identification data satisfying a condition predetermined based on the corresponding service, from among identification data included in the list, a displaying unit (not illustrated) that displays information with respect to the identified identification data, and a selection unit (not illustrated) that selects identification data corresponding to information selected from among the displayed information by the user, as identification data suitable for the corresponding service.

The verification data generating unit 304 generates verification data based on the selected identification data and the session key. The verification data generating unit 304 may generate an MAC using the selected identification data and the session key, and may use the MAC as the verification data. A hash function may be used for generating the MAC.

The transmitting unit 305 transmits the selected identification data and the verification data to the mobile system 340. Verification data may be verified to verify the selected identification data.

The user data receiving unit 306 receives encrypted user data from the mobile system 340. Here, the encrypted user data may be generated by encrypting user data corresponding to the selected identification data using a session key of the mobile system 340 in the mobile system 340.

The decrypting unit 307 decrypts the encrypted user data using the session key. That is, the mobile system 340 may encrypt user data with respect to the identification data selected in the identification data selection unit 303 to transmit to the service system 300, and the decrypting unit 307 may decrypt the encoded user data using the session key.

The service providing unit 308 provides the corresponding service based on the decrypted user data. As described above, the service system 300 may receive user data corresponding to the corresponding service from the mobile system 340 storing a variety of user data, and may provide the corresponding service to a user using the user data.

The service system may be used for complementing a user interface of the mobile system according to examples, or for providing a better service.

Figure 4:
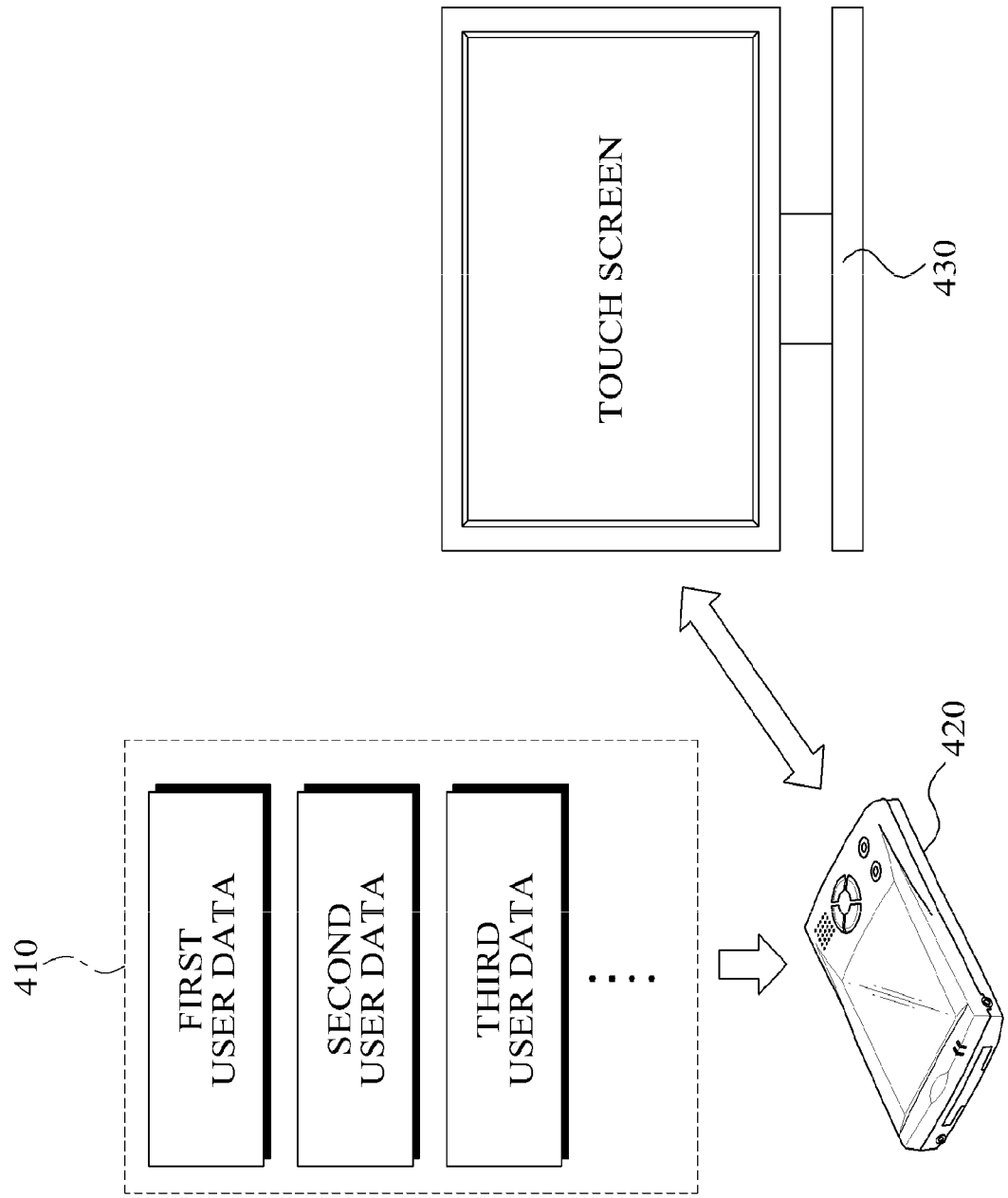
FIG. 4 is a diagram illustrating an example of a touch screen terminal which may be used as an exemplary service system.

FIG. 4 illustrates a touch screen terminal 430 which may be used as an exemplary service system. That is, as illustrated in a first dotted-line box 410 of FIG. 1, where a user intends to receive a complex service directly via a wireless network of a mobile communication terminal 420 storing a plurality of user data, a difficult and complex input process may be used due to limitations of a user interface of the mobile communication terminal 420, and there may also be limitations of outputting the service. As illustrated in FIG. 4, the user may securely transmit user data used for the corresponding service from the mobile communication terminal 420 to a touch screen terminal 430 using the touch screen terminal 430, and concurrently may be provided with the corresponding service via a more convenient user interface. As an example, where a payment service for a product is provided via the touch screen terminal 430, the touch screen terminal 430 may discover an optimal payment means using a list of identification data to display on the touch screen, and user may purchase the product by simply touching the screen without exposure of user data.

Figure 5:
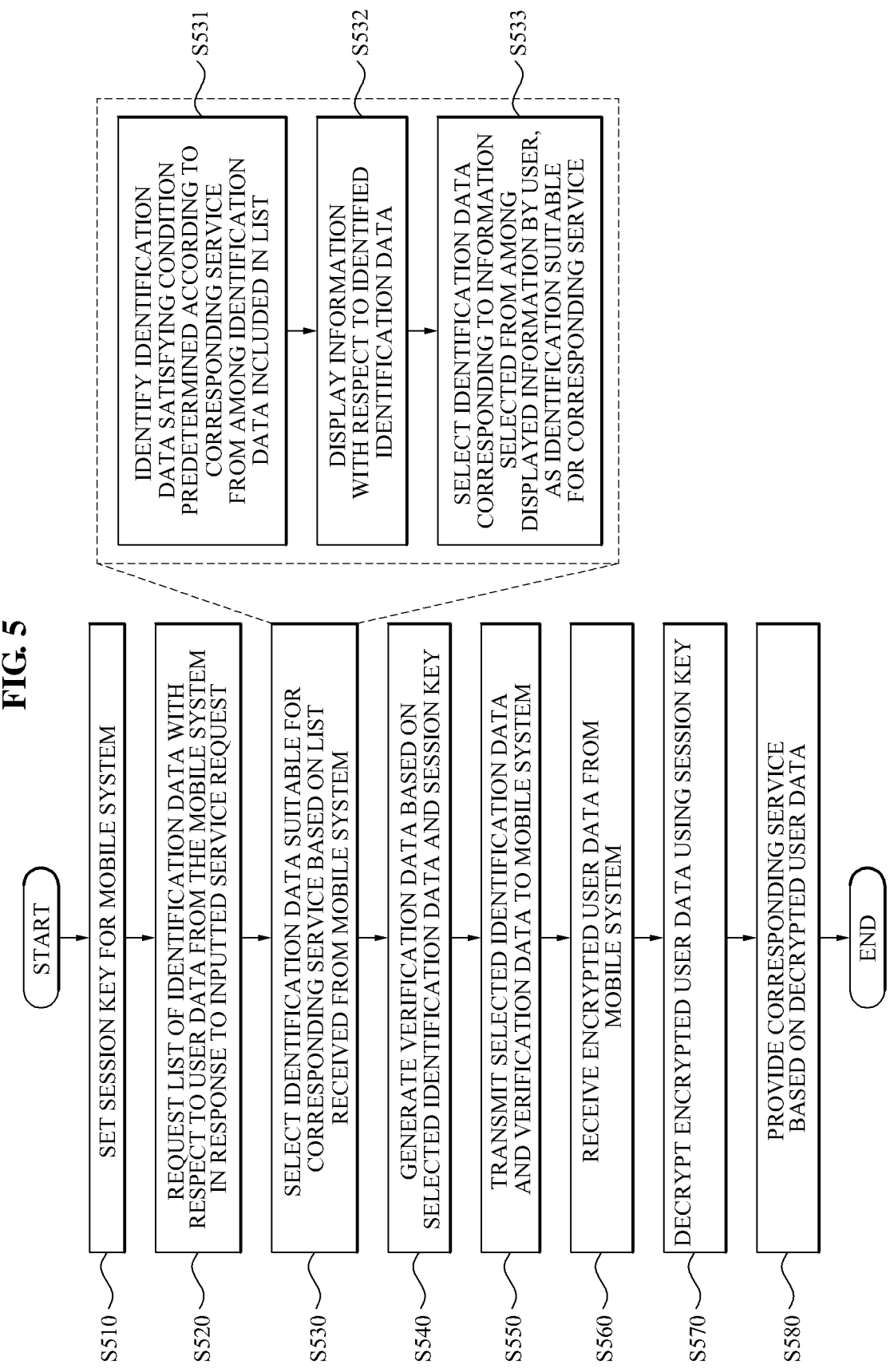
FIG. 5 is a flowchart illustrating an exemplary service providing method.

FIG. 5 is a flowchart illustrating an exemplary service providing method. The service providing method may be performed through the service system 300 described with reference to FIG. 3. Hereinafter, the service providing method will be described by describing each operation performed via the service system 300.

In operation S510, the service system 300 sets a session key for a mobile system. The session key set between the mobile system and the service system 300 may be used for encrypting and decrypting the user data.

In operation S520, the service system requests a list of identification data with respect to the user data from the mobile system in response to an inputted service request. Here, as an example, the user data may include payment data used for mobile payment, and the identification data may include information for identifying a type of payment corresponding to the payment data. The mobile system may maintain different formats of user data depending on payment means and identification data with respect to the user data as data of a predetermined format. That is, the service system 300 may request the list with respect to identification data that the mobile system maintains from the mobile system.

In operation S530, the service system 300 selects identification data suitable for the corresponding service based on the list received from the mobile system. The service system 300 may perform identifying of identification data satisfying a condition predetermined according to the corresponding service, from among identification data included in the list in operation S531, may display information with respect to the identified identification data in operation S532, and may select identification data corresponding to information selected from among the displayed information by a user, as identification data suitable for the corresponding service in operation S533.

In operation S540, the service system 300 generates verification data based on the selected identification data and the session key. The service system 300 may generate an MAC using the selected identification data and the session key, and may use the MAC as the verification data. A hash function may be used for generating the MAC.

In operation S550, the service system 300 transmits the selected identification data and the verification data to the mobile system. The verification data may be verified to verify the selected identification data.

In operation S560, the service system 300 receives encrypted user data from the mobile system. Here, the encrypted user data may be generated by encrypting user data corresponding to the selected identification data using the session key of the mobile system in the mobile system.

In operation S570, the service system 300 decrypts the encrypted user data using the session key. That is, the mobile system may encrypt user data with respect to the selected identification data to transmit the encrypted user data to the service system 300, and the service system 300 may decrypt the encoded user data using the session key.

In operation S580, the service system 300 provides the corresponding service based on the decrypted user data. As described above, the service system 300 may receive user data corresponding to the corresponding service from the mobile system 340 storing a variety of user data, and may provide the corresponding service to the user using the user data.

Figure 6:
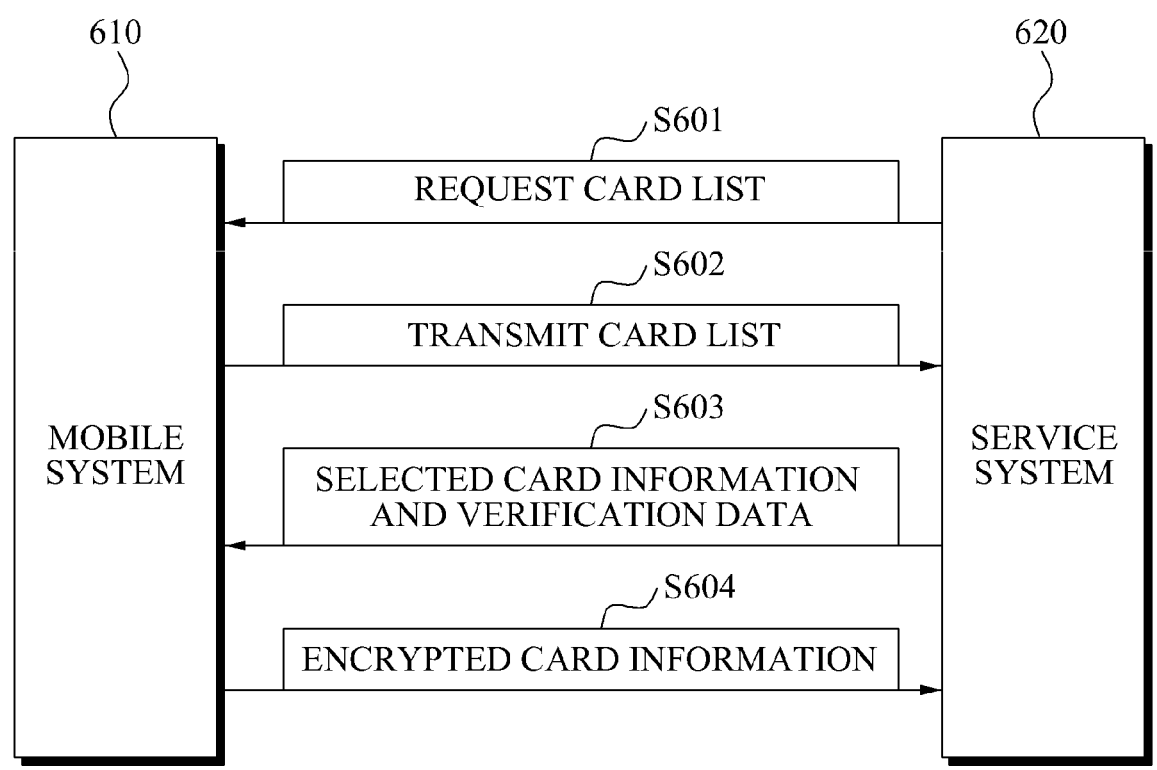
FIG. 6 is a diagram illustrating an exemplary method of mobile payment using a mobile system and a service system.

FIG. 6 is a diagram for illustrating an exemplary method of mobile payment using a mobile system 610 and a service system 620 according to exemplary embodiments. The mobile system 610 and the service system 620 may correspond to a mobile system and a service system of FIGS. 2 and 3.

The mobile system 610, which maintains information for a plurality of cards as user data and information for a type of the cards as identification data, may set a session key for the service system 620. The service system 620 may request a list of identification data according to selection of a user, in other words, may request a list of the cards in operation S601, and the mobile system 610 may transmit the list of the cards in operation S602. The service system 620 may display information with respect to an optimal card for payment of a product from among cards included in the list of the cards to recommend to the user, and may transmit selected card information indicating a type of the card selected by the user and verification data to the mobile system 610 in operation S603. The mobile system 610 may verify the selected card information using the verification data, and may encrypt the card information, which is user data corresponding to the selected card information, using the session key to transmit the encrypted user data to the service system 620 in operation S604. The service system 620 decrypts the encrypted card information using the session key to obtain the card information for payment, and provides a payment service for the product to the user using the card information.

According to the examples described above, there may be provided a method for maintaining user data used for a variety of services, such as a social security number, a credit card number, and the like, in a single storage medium, and transmitting the user data to a corresponding service system without exposure to another user or to another system using a session key.

According to the examples described above, there may be provided a method for recommending user data suitable for a service that a user intends to use from among a variety of service stored in a storage medium of a mobile system, and fir directly receiving the corresponding user data from the mobile system using a session key to provide the corresponding service.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile system comprising:
a data maintaining unit to maintain at least one user data, the at least one user data used for processing at least one service data and at least one identification data with respect to the user data;
a session key setting unit to set a session key for a service system to which the at least one user data is to be sent;
a list transmitting unit to transmit a list of the at least one identification data to the service system;
an identification data identifying unit to identify identification data that is selected by the service system based on the list;
a verification data receiving unit to receive service verification data that is generated by a predetermined algorithm based on the selected identification data and the session key;
a verifying unit to generate mobile verification data using the predetermined algorithm and verify the selected identification data by comparing the service verification data with the mobile verification data;
a user data identifying unit to identify user data corresponding to a service processed in the service system, based on the identified identification data;
an encrypting unit to encrypt the identified user data using the session key; and
a data transmitting unit to transmit the encrypted user data to the service system,
wherein the same session key is used for verification and encryption.

2. The system of claim 1, wherein the encrypted user data is decrypted by a session key that is set in the service system, and the corresponding service of the service system is processed based on the decrypted user data.

3. The system of claim 1, wherein the identification data selected by the service system comprises identification data corresponding to information selected by a user from among displayed information.

4. The system of claim 1, wherein the identified user data comprises payment data used for mobile payment, and the identified identification data comprises information for identifying a type of payment corresponding to the payment data.

5. The system of claim 3, wherein the data maintaining unit maintains different formats of user data depending on payment means as data of a predetermined format.

6. The system of claim 1, wherein the encrypted user data is transmitted directly to the service system without providing to other user or to other system.

7. A service system, comprising:
a session key setting unit to set a session key for a mobile system;
a list requesting unit to request a list of identification data with respect to user data, from the mobile system, in response to an inputted service request;
an identification data selection unit to select identification data suitable for a corresponding service based on the list received from the mobile system;
a verification data generating unit to generate service verification data using a predetermined algorithm based on the selected identification data and the session key;
a transmitting unit to transmit the service verification data to the mobile system for comparing with mobile verification data generated by the mobile system based on the predetermined algorithm,
a user data receiving unit to receive encrypted user data from the mobile system;
a decrypting unit to decrypt the encrypted user data using the session key; and
a service providing unit to provide the corresponding service based on the decrypted user data;
wherein the encrypted user data is generated by encrypting user data corresponding to the selected identification data using the session key of the mobile system, and the same session key is used for verification and encryption.

8. The service system of claim 7, wherein the identification data selection unit comprises:
an identification data identifying unit to identify identification data satisfying a condition predetermined according to the corresponding service, from among identification data included in the list;
a displaying unit to display information with respect to the identified identification data; and
a selection unit to select identification data, corresponding to information selected from among the displayed information by the user, as identification data suitable for the corresponding service.

9. The service system of claim 7,
wherein the transmitting unit transmits the selected identification data and the service verification data to the mobile system, and the service verification data is verified in the mobile system to verify the selected identification data.

10. The service system of claim 7, wherein the user data comprises payment data used for mobile payment, and the identification data comprises information for identifying a type of payment corresponding to the payment data.

11. The service system of claim 10, wherein the mobile system maintains different formats of user data depending on payment means and identification data with respect to the user data as data of a predetermined format.

12. A method for providing a service, the method comprising:
setting a session key for a mobile system;
requesting a list of identification data with respect to user data, from the mobile system, in response to an inputted service request;
selecting identification data suitable for a corresponding service based on the list received from the mobile system;
generating service verification data using a predetermined algorithm based on the selected identification data and the session key;
transmitting the service verification data to the mobile system for comparing with mobile verification data generated by the mobile system based on the predetermined algorithm,
receiving encrypted user data from the mobile system;
decrypting the encrypted user data using the session key; and
providing the corresponding service based on the decrypted user data;
wherein the encrypted user data is generated by encrypting user data corresponding to the selected identification data using the session key of the mobile system, and the same session key is used for verification and encryption.

13. The method of claim 12, wherein the selecting of the identification data comprises:
identifying identification data corresponding to a condition predetermined according to the corresponding service, from among identification data included in the list;
displaying information with respect to the identified identification data; and
selecting identification data, corresponding to information selected by the user and from among the displayed information, as the identification suitable for the corresponding service.

14. The method of claim 12, further comprising transmitting the selected identification data and the service verification data to the mobile system, wherein the service verification data is verified in the mobile system to verify the selected identification data.

15. The method of claim 12, wherein the user data comprises payment data used for mobile payment, and the identification data comprises information for identifying a type of payment corresponding to the payment data.

16. The method of claim 15, wherein the mobile system maintains different formats of user data depending on different payment means and identification data with respect to the user data as data of a predetermined format.

* * * * *